(12) United States Patent
Rubel, Jr.

(10) Patent No.: US 7,996,372 B2
(45) Date of Patent: Aug. 9, 2011

(54) AUTOMATED RESPONSE TO SOLICITED AND UNSOLICITED COMMUNICATIONS AND AUTOMATED COLLECTION AND MANAGEMENT OF DATA EXTRACTED THEREFROM

(75) Inventor: Michael J. Rubel, Jr., Greenville, SC (US)

(73) Assignee: Mercury Communications Group, LLC, New York, NY (US)

( * ) Notice: Subject to any disclaimer, the term of this patent is extended or adjusted under 35 U.S.C. 154(b) by 1166 days.

(21) Appl. No.: 11/328,269

(22) Filed: Jan. 9, 2006

(65) Prior Publication Data

US 2006/0167834 A1    Jul. 27, 2006

Related U.S. Application Data

(60) Provisional application No. 60/644,873, filed on Jan. 18, 2005.

(51) Int. Cl.
G06F 7/00 (2006.01)
(52) U.S. Cl. .......................................... 707/694; 707/702
(58) Field of Classification Search ............... 707/104.1, 707/100–101, 694, 826
See application file for complete search history.

(56) References Cited

U.S. PATENT DOCUMENTS

| | | | | |
|---|---|---|---|---|
| 6,029,195 A * | 2/2000 | Herz | ............................ | 725/116 |
| 6,047,277 A * | 4/2000 | Parry et al. | ....................... | 706/20 |
| 6,161,130 A * | 12/2000 | Horvitz et al. | ................ | 709/206 |
| 6,278,996 B1 * | 8/2001 | Richardson et al. | ............ | 707/6 |
| 6,515,681 B1 * | 2/2003 | Knight | .......................... | 715/751 |
| 7,360,151 B1 * | 4/2008 | Froloff | ........................ | 715/255 |
| 7,409,336 B2 * | 8/2008 | Pak et al. | .......................... | 704/9 |
| 2004/0015427 A1 * | 1/2004 | Camelio | ......................... | 705/35 |
| 2004/0260534 A1 * | 12/2004 | Pak et al. | .......................... | 704/7 |
| 2005/0004838 A1 * | 1/2005 | Perkowski et al. | ............. | 705/14 |
| 2005/0086239 A1 * | 4/2005 | Swann et al. | ................. | 707/100 |

OTHER PUBLICATIONS

International Search Authority/US, International Search Report, Aug. 30, 2007, 3 pages, United States Patent Office, Alexandria, Virginia.
International Search Authority/US, Written Opinion of the International Searching Authority, 4 pages, United States Patent Office, Alexandria, Virginia.

* cited by examiner

Primary Examiner — James Trujillo
Assistant Examiner — Linh Black
(74) Attorney, Agent, or Firm — Haynes and Boone, LLP (57) ABSTRACT

An automated correspondence response system is provide for permitting a receiving entity to generate customized responses based on data extracted from received communications. The system also provides for automated management and manipulation of data extracted from correspondence received by a receiving entity for group profiling and to perform various statistical analysis thereof.

The system analyzes content of received correspondence, such as celebrity fan mail, and manages the automation of responses via targeted or "customized" letters, wherein the receiving entity creates content specific fields or terms in order to respond to correspondence in an automated and yet relevant manner. The receiving entity can electronically define what data is extracted from the correspondence. A particular "customized" response to the correspondence may be electronically selected from a plurality of possible responses based on the data extracted from the sender's correspondence so that the receiving entity can effectively respond to the sender. The "customized" automated response can also be "personalized" by including sender specific data in the "customized" automated response.

18 Claims, 4 Drawing Sheets

AUTOMATED RESPONSE TO SOLICITED AND UNSOLICITED COMMUNICATIONS AND AUTOMATED COLLECTION AND MANAGEMENT OF DATA EXTRACTED THEREFROM

REFERENCE TO RELATED APPLICATION

This application claims benefit of provisional patent application Ser. No. 60/644,873, filed Jan. 18, 2005.

TECHNICAL FIELD OF THE INVENTION

The present subject matter generally concerns a system and method for extraction, analysis, manipulation and management of data collected from correspondence and more specifically, to the generation of targeted, automated responses to unsolicited and solicited correspondence based on analysis of such collected data.

BACKGROUND OF THE INVENTION

Entities such as professional athletes, politicians, musicians, actors and companies (generally referred to herein as a "celebrity") receive large amounts of solicited and unsolicited correspondence such as mail, email or other communications. Answering such correspondence is a tedious, expensive, and time-consuming process. Companies have departments of employees dedicated to responding to these communications. For individuals such as politicians, athletes, politicians, musicians, actors and others, it is much harder to organize a concerted effort to answer the correspondence that they receive. For example, an estimated 75% of all sports related fan mail is left unanswered. Those athletes that do respond often pay family members, friends or webmasters to read and answer their mail.

Further, a celebrity that does respond to such correspondence often discards the correspondence after a response is written and fails to capitalize on an opportunity to collect data from the communication and analyze valuable information regarding the people interested in or concerned with that celebrity. Such information can be useful for tracking demographics of interested parties and creating targeted marketing efforts. Recent security concerns have created a new demand in the handling and analysis of correspondence. Such information can provide data to identify individuals who can be classified as a threat to the entity receiving the correspondence, such as, for example, a stalker.

One response in the prior art for handling such correspondence is to utilize personnel who manually review and handle correspondence received by individuals such as athletes, musicians, and actors. Various companies also offer such services. These companies utilize a manual process, responding to each letter by hand. While much information can be gleaned from this manual process, it is personnel intensive, time-consuming, inefficient and expensive. Further, results can be inconsistent since "relevant" data is based on the judgment of the individual reviewing a particular piece of correspondence. Another prior art response is to simply generate a generic response to such correspondence. In the case of such a generic response, no matter what kind of communication is received or the particular data contained in the communication, the sender will receive the same response. Such a response is likely to leave a correspondence sender unsatisfied. Moreover, such a response is not likely to be effective in collecting information about the sender.

There are no products in the prior art that can effectively provide such analysis. The database management and text-processing applications of the prior art tend only to enable users to locate key words within textual documents. For example, Microsoft Word enables users to search for key words and Oracle applications provide Boolean search tools to locate data. However, these prior art products are not capable of searching a database of correspondence, such as solicited or unsolicited mail, email and other communications, in order to effectively automate responses in a customized format based on individual correspondence content.

Thus, the prior art is unable to efficiently and effectively generate automatic, meaningful or "custom" response to correspondence, particularly significant amounts of correspondence. Furthermore, the prior art does not provide any means for deriving additional value from the inherent data found within databases formed of information extracted from such correspondence. Therefore, a need exists for a system and method for database development, data-mining and data-manipulation of correspondence send to receiving entities and customization of responses based on content or other terms contained in the correspondence as defined by the receiving entity. Such a system should include an effective interface between an end user celebrity and the correspondence database that provides access to the correspondence and manipulation of the data collected therefrom.

SUMMARY OF THE INVENTION

The present invention is a system and method for automated response to correspondence received by a receiving entity. The system also provides for automated management and manipulation of data extracted from correspondence received by a receiving entity.

Moreover, the invention provides a system that effectively analyzes content of received correspondence, such as celebrity fan mail, and manages the automation of responses via targeted or "customized" letters, wherein the receiving entity creates content specific fields or terms in order to respond to correspondence in an automated and yet relevant manner.

Correspondence is electronically scanned, filed or otherwise imported into a database. Specified data extracted from the correspondence is electronically maintained in the database creating the content of the database. A user interface to the database is provided to enable the receiving entity to effectively interact with the database, such as selecting fields for use in the automated response. A response to the correspondence may be electronically selected from a plurality of responses based on the data extracted from the correspondence so that the receiving entity can most effectively respond to the sender. Such a response may be sent electronically or may be printed on an electronically controlled printing device to be sent via a postal service.

The receiving entity can electronically search all or some of the database and define key content that enables the automation of a customized response process. Thereby, the receiving entity can electronically define what data is extracted from the correspondence. Also, customized responses, in definable formats that are specific to the receiving entity and the sender, may be electronically facilitated. The receiving entity may thus draft a plurality of automated responses that are "customized." The particular "customized" response selected by the system will be based on the data extracted from the sender's communication. Further, the customized response can then be "personalized" to a specific fan based on that fan's data maintained in the database.

The receiving entity can electronically perform custom or automated analysis of the data or database. For instance, the receiving entity may electronically consolidate and manipulate content across or within the database to provide trend reports and otherwise search results for public or private use. The receiving entity can import general data for the use of comparison to database and content trends. Using the database, the receiving entity can correlate the extracted data against publicly or privately held content in order to enhance, match or correct database content. This analysis can subsequently be used to refine and enhance the automated responses based on trend analysis or other profiling.

DETAILED DESCRIPTION

In the detailed description of the invention, like numerals are employed to designate like parts, elements, processes or steps throughout. Various elements, processes, step or items of equipment may be omitted to simplify the description. However, those skilled in the art will realize that such conventional elements, processes, steps or equipment can be employed as desired.

Figure 1:
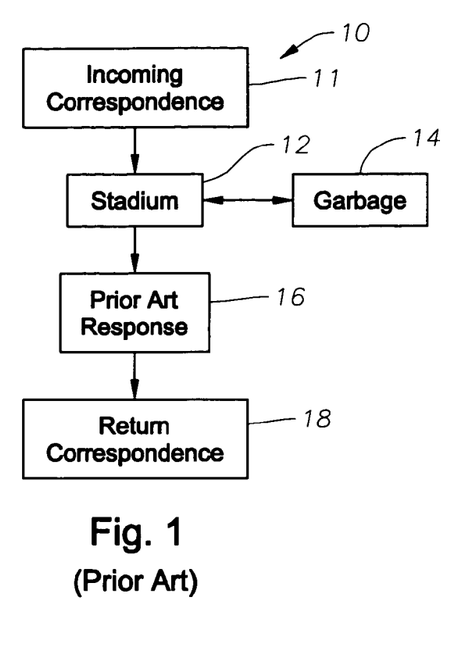
FIG. 1 illustrates the standard athlete fan mail correspondence fulfillment process of the prior art.

FIG. 1 illustrates the current response process 10 of the prior art, wherein fan mail 11 embodied in physical communications, such as cards, letters and the like, is delivered to a location 12 associated with a celebrity, such as the stadium of an athlete or the celebrity's home, office or other venue. At such location 12, mail 11 is typically either passed on to the athlete to which it is addressed or is disposed of in a garbage collection unit 14. If the celebrity receives the fan mail 11, then he or she might either send a response 18 back to the sender and then disposes of the correspondence 11 sent by the sender or the celebrity may dispose of the correspondence 11 without sending a response 18. In either case, no meaningful information is gleaned from the correspondence 11. Further, in such a prior art response processes 10, many letters and other correspondence remain unanswered, which could potentially have the effect of deteriorating the fan base of the celebrity.

Figure 2:
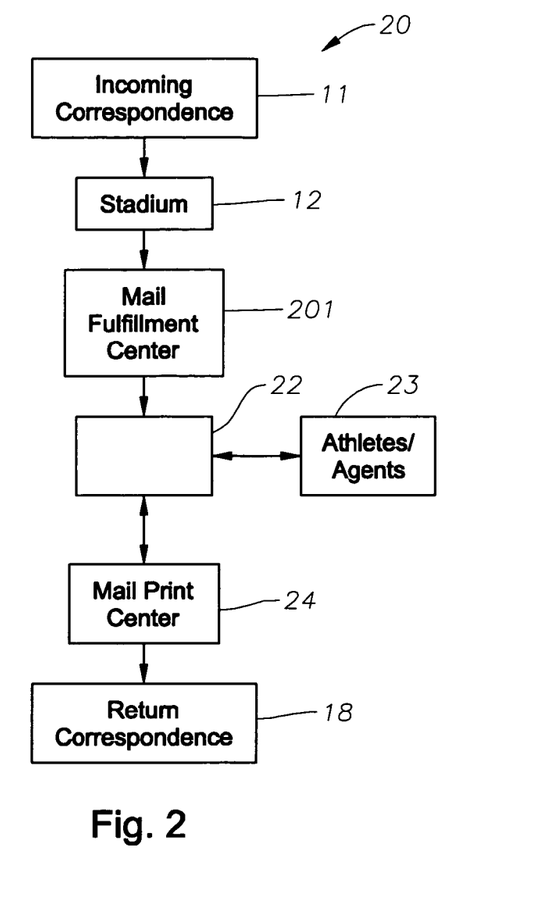
FIG. 2 shows a block diagram representation of a correspondence fulfillment method and system according to the invention.

FIG. 2 depicts a correspondence fulfillment or response process 20 for responding to fan mail 11 of a celebrity. Using the correspondence fulfillment method 20 of the current invention, the correspondence 11 is received by a mail fulfillment center 21. If the correspondence 11 is not already in electronic format, such as an email or electronic facsimile, the correspondence 11 is scanned to create an electronic copy of the correspondence 11. Emails or other electronic communications may simply be reformatted as necessary to accommodate the following analysis. In any event, once electronically formatted, data can be extract from such correspondence 11. This data is then imported into a database 22 maintained on a computer system 108 (FIG. 6), such as a web-based or other network-based system. From the data collected and stored in the database 22 about the fan sending the correspondence 11, the computer system 108 can generate information that can be passed onto the celebrity 23 to help the celebrity 23 better understand or profile the fan base based on information extracted from letter 11. The computer system 108 can also select a response letter 18 or other communication from a plurality of possible response letters 29 (FIG. 3) that have been created to appear "customized." The selected response communication 18 can also can be "personalized" with specific information prior to being printed out at a mail print center 24. Such specific information may include data extracted from correspondence 11 associated with the specific fan to whom the response communication 18 will be sent.

Additionally, the celebrity 23 can interface with the database 22 of the computer system to analyze the data collected from the correspondence 11 and/or access and review the received communication 11. The celebrity 23 can also customize response letters 18. With such a method and system, the celebrity 23 receives valuable information about his fan base, while generating communications that are most likely to keep the fan base engaged, interested and satisfied.

Figure 3:
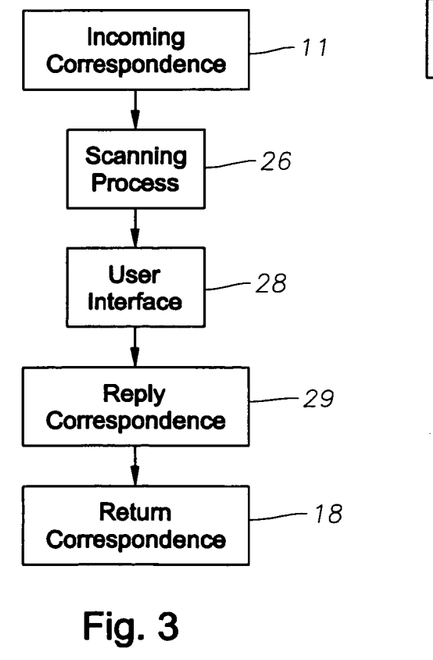
FIG. 3 shows a more detailed block diagram representation of various steps of the correspondence and fulfillment method and system of FIG. 2.
Figure 6:
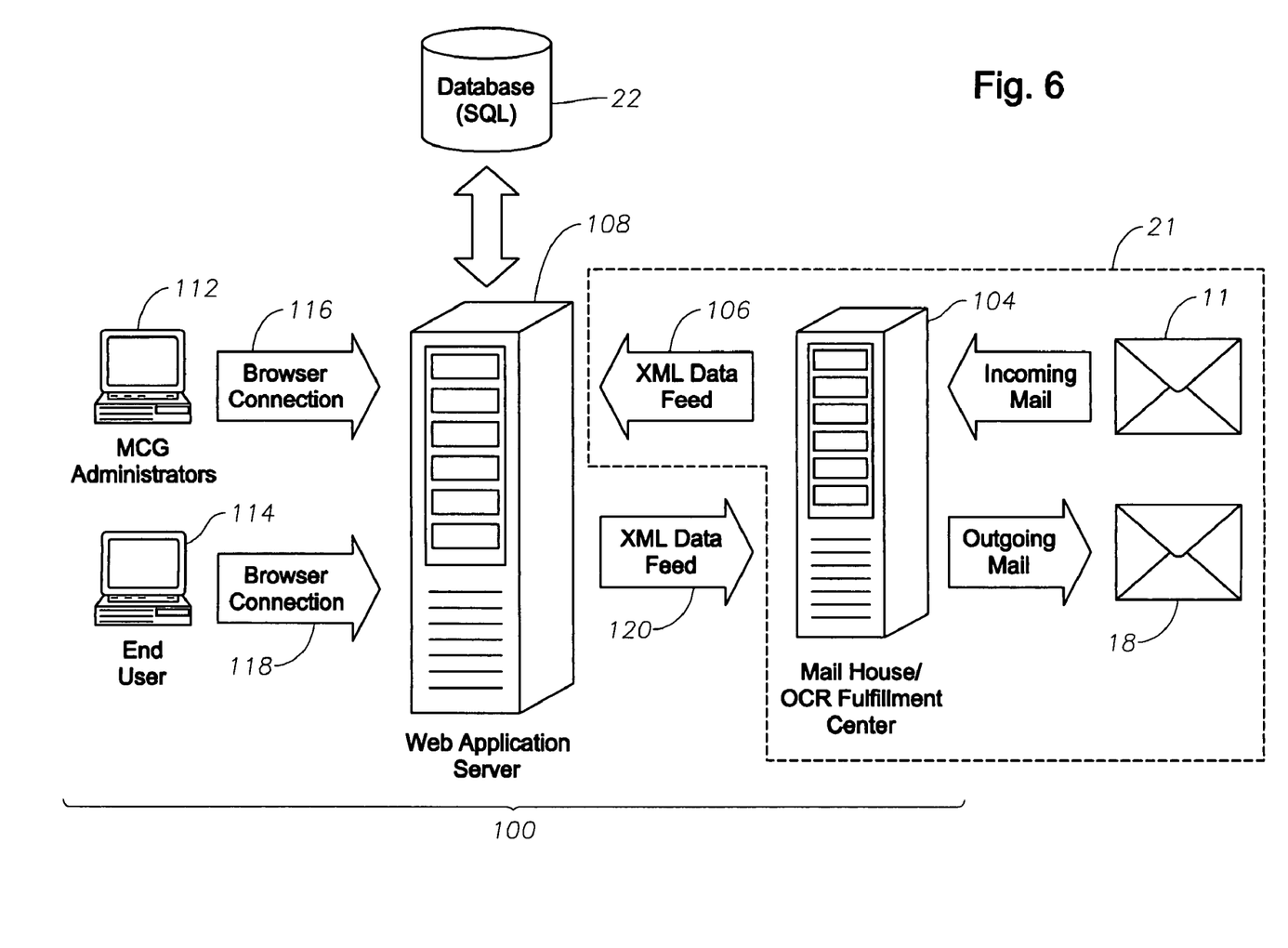
FIG. 6 shows a schematic representation of the interaction among exemplary hardware components of a web-based system of correspondence fulfillment system of the invention.

Referring to FIG. 3, an exemplary embodiment of a correspondence fulfillment method and system, generally 20, is presented. When correspondence 11 sent by a sender is received by a receiving entity, such as for example, fan mail sent by a sports fans to an athlete, the correspondence 11 is scanned in a scanning process 26 into a web-based or network-based computer system 108 (FIG. 6). The data extracted from the scanned correspondence is stored on a database 22. The data is associated with an account designated for the celebrity 23 to whom the correspondence 11 was mailed. A user interface 28 is provided to permit the celebrity 23 to access database 22 and interact therewith. The user interface 28 may be local to the computer system but is more likely to be remote therefrom. For example, for web-based applications of the system 20, the user interface 28 can be accessed from any secure computer having Internet access. In such case, as a further example only, Active Server Pages ("ASP") can be used along with known web-page securing technology to create a securable access to the computer system. As can be seen in FIG. 3, the computer system provides for a plurality of customized responses 29 from which to choose the appropriate response 18 based on the data and various defined criteria. Furthermore, beyond providing various customized responses 29 from which to choose, the particular custom response 18 can be "personalized" to the sender based on the sender's information compiled in the database.

In the preferred embodiment utilizing a login ASP page, a celebrity 23 desiring access to their account need only access the ASP page and enter their username and password associated with their account. The web-based program (ASP) allows users to login over a secure Internet connection to a customized client interface. Specific permission levels within a celebrity's account can be assigned in order to enable multiple parties to access multiple levels of data. Data access segmentation also allows for multiple business models. Typical levels of access may be defined as follows:

a. Global Administrator (Provider)
    i. Can View and Edit all information in the system
    ii Can Access the Billing Center b. Main Customer (Account Holder)
   i. Can view, edit and manage everything related to their Account
   ii. Can add Sub Account holders and set basic permissions c. Customer (sub-account holder)
   i. Can be designated to do any or all of the following:
      1. View only info related to a certain athlete
      2. View Mail
      3. Reply to Mail
      4. Batch Process Mail
      5. Delete Mail
      6. Run Reports
      7. Search Archives
      8. Manage Letters.

In one preferred embodiment, the global administrator is the provider of the correspondence fulfillment system and would have access to all the information on all the accounts on the system in order to service and/or monitor the system and control billing for the service. The main customer or "Account Holder" would be the communication receiving party or celebrity 26 (or their designated agent/representative), and would have full access to received communications 11 as well as the database 22 formed of extracted data. Such Account Holder would have the ability to edit all data related to their account. For Account Holders who receive large volumes of correspondence 11, sub-accounts can be enabled within an account, permitting more limited access to designated individuals who could assist in management of the account, particularly to the extent there is a large volume of correspondence 11 to be handled. The Account Holder can restrict these sub-accounts as he/she deems appropriate and can limit access to certain tasks within the account.

Once logged on, a user will be presented with a user interface 28 through which the user can perform various tasks. In one illustrative embodiment, shown in FIG. 4, user interface 28 is provided with a number of defined fields and/or screens 30, such as received letter field 31. In the received letter field 31, scanned letters 11 may be viewed. In a sub-field 32 associated with received letter field 31, one can elect to take a particular action, such as to generate an answer 18, and in the case of a generated answer, the "customized" answer letter to be generated. In the example, a user can select from letter types A, B, C or D that comprise the plurality of responses 29 referenced in FIG. 3. In one preferred embodiment, each of letter types A, B, C and D represents a different "customized" letter that has been prepared based on particular pre-defined criteria. Based on the particular data extracted from a scanned letter 11, the system can suggest which letter type A, B, C or D would be most appropriate as response letter 18. Sub-field 32 may also identify the action taken and identify the particular user responsible for taking that action, thereby permitting an Account Holder to monitor responses by various individuals. Other information such as the quantity and dates of the correspondence received can be monitored as well.

Figure 4:
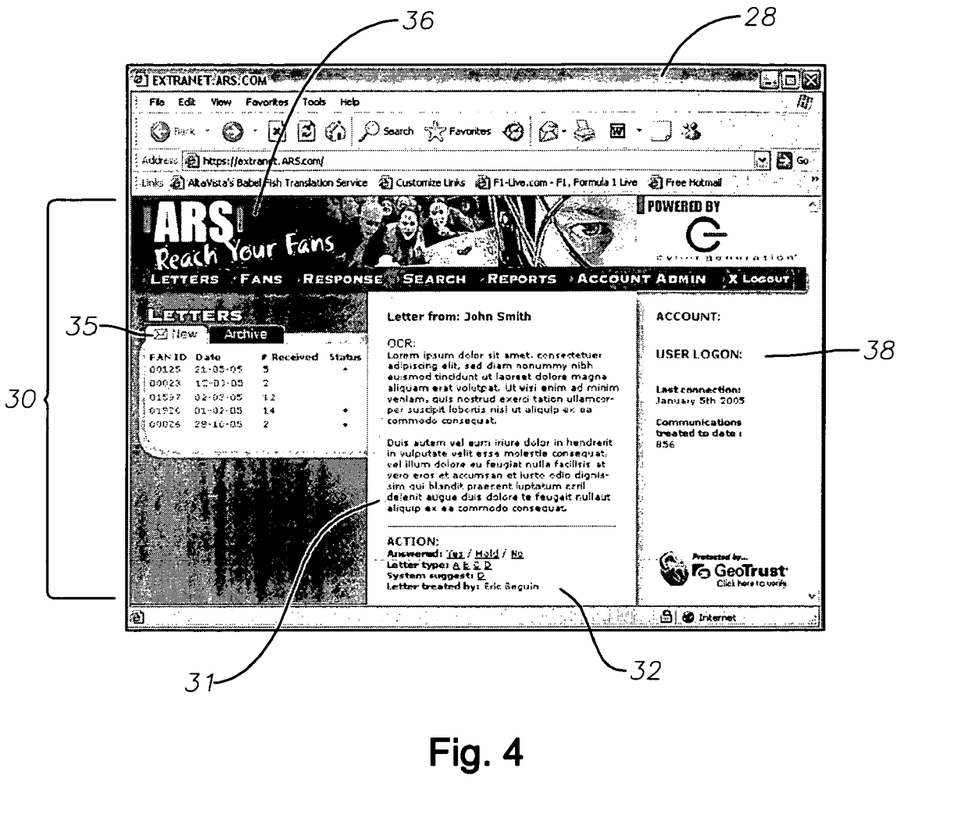
FIG. 4 illustrates a user interface screen usable in the correspondence fulfillment method of the invention.

Those skilled in the art will understand that user interface 28 can have many different fields and screens based on different Account Holders and different functions to be achieved, including the database used to store and manipulate the data. As a further example, field 33 displays a new letter sub-field 35 and an archived letter sub-field 36. In both sub-fields, various information about a sender can be provided. In the example, each "fan" is assigned an identification number and the number of communications 11 from a particular fan can be tracked. By accessing a particular fan's identification number, all of the received letters 11 from that fan are available for viewing. In another field 38, the Account Holder is identified, along with the particular user accessing interface 28. Likewise, one is provided with the ability to view a list of "fans", i.e., individuals identified as the sender of correspondence 11, to view responses 18, to conduct searches, to conduct analysis of database 22 and to generate reports based on the foregoing. The ability of a user to access database 22 will enable the user to manipulate, respond to or otherwise execute the fulfillment of communications 18. Further, it promotes interfacing with the content within the database 22. Such interaction can include for example: adding letters and responses, changing letters and responses, viewing letters and responses, sending responses, viewing recent activity, creating template letters for responses, and enabling the customer to include variables like First Name and E-mail.

Figure 5:
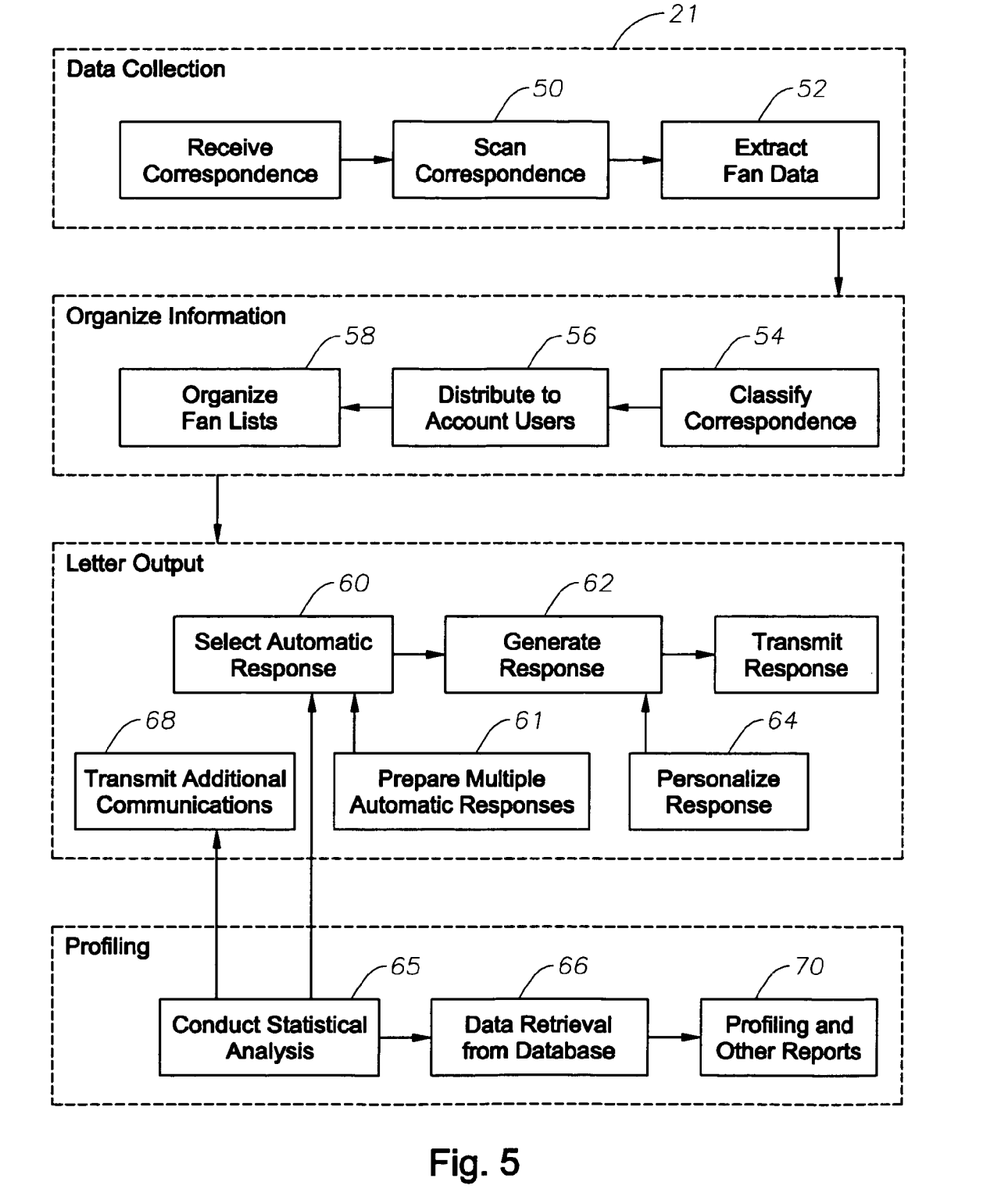
FIG. 5 shows a flow chart illustrating steps of one preferred embodiment of the correspondence fulfillment method and data mining system of the current invention.

In FIG. 5, a flow chart illustrating the steps in one embodiment of the correspondence fulfillment method is illustrated. In this embodiment, data is first collected. As shown in this data collection process, in a first step 49, a communication 11 such as a letter, envelope, e-mail, instant message, phone call, note, text message and/or other communication, is received by the mail fulfillment center 24. In step 50, the received communication 11 is scanned, saved or otherwise imported into the computer system 104 (see FIG. 6) at a mail fulfillment center 21. This mail fulfillment center 21 may be a remote location, such as where the administrators are located, or may be within the location where the Account Holder accesses the computer system. In step 50, the scanned, saved, or imported communication 11 is preferably saved as an image file such as a .pdf file, a .bmp file, a .jpg file, etc., and is stored in the computer system 104, 108. In one preferred embodiment of step 50, Optical Characteristic Recognition ("OCR") software technology or other scanning technology, which are commonly available and known in the art, is used by computer system 104 to transform the image file into and save it as a text file (".txt file"). The particular characteristics of the electronic file format will depend in part on the type of data analysis software used to analyze the communication 11.

Once the communication is saved as an electronic file, in step 52, data extraction software, such as, for example only, spatial aspect software, (all of which are commonly available and known in the art) may be used by the computer system to extract information from the text file about the sender and the communication 11 itself. For example, a typical letter is comprised of various parts, including a letterhead/return address/address of sender, a date, addressee information, a salutation, a body (text), a closing, a signature and a typed name. The address of the sender may further include contact information such as a phone number, facsimile number, email address and the like. Since each of these components is typically positioned in the same place a letter, data extraction software, such as special aspect software, may be used to extract various types of information from the letter. For example, the return address on the top left hand corner of the envelope or top center of the letter may be characterized as "identity data" providing the name, address and contact information of the sender or fan. Likewise, information extracted from the portion of a page on which the body of the letter is printed may be characterized as "profile data", providing information on the preferences, likes, dislikes or other substantive information about the sender or fan.

In some embodiments, it may be beneficial to identify the type of correspondence stored in the computer system to aid the data extraction software in locating pertinent information. For example, a physical letter is arranged in one format such as described above, while emails are arranged in a completely different format. It is well known that emails typically just include the email address of the recipient, the email address of the sender, a subject line and a field for the message. However, emails typically include additional information embedded in the communication, such as header information that may include additional information on the sender, the routing of the email, etc. Thus, extraction software will operate differently on different types of communications 11. In any event, once the information is extracted, it can then saved to database 22 for further organization. Typical information collected can include, but is not limited to:

Name—First;
Name—Last;
Address—Street;
Address—Apartment Number;
Address—City;
Address—State/Province;
Address—Zip;
Address—Country;
Info 1—Phone number;
Info 2—Email Address;
Info 3—Gender;
Info 4—Age; and
Info 5—Birthday.

Of course, database 22 may store other information from the electronic file along with the information retrieved by the extraction software, for example, the content of the letter, notes, e-mail, or other communication as well as possibly pictures or other image files.

In any event, once data has been extracted from communication 11 and saved on database 22, it can be organized for the various uses described herein, such as fan base profiling and analysis, and of course, automated letter output.

In one embodiment of organizing the information, the content of communication 11 may be searchable using a keyword searching software technology to help determine what type of communication has been received and/or perform grouping or rearrangement of particular data. For example, in step 54, the communication can be classified utilizing key word or phrase searching technology. Such classifications may typically include a negative communication, a request for services, a request for products or memorabilia, or just general fan mail. Such information can also be stored on the database 22. In any event, once classified in step 54, the scanned correspondence 11 or notices related thereto, can be communicated to the appropriate individuals. For example, in step 56, general fan mail might be forwarded to a celebrity 23, while a request for services might be forwarded to a different user, such as the celebrity's manager. In one organizational step the extracted information can be utilized to prepare fan lists, such as in step 58.

Those skilled in the art will understand that database 22 may be constructed using various computer languages or database formats that are known in the industry.

As described herein, one of the primary functions of the invention is to provide a system for automated generation of "customized" responses 11. In this regard, database 22 may store a plurality of responses 29 (such as A, B, C and D of sub-field 32 in FIG. 4) from which the computer system 108 can choose a response 18 to respond to the communication 11. As used herein, unless otherwise indicated, a "custom response" is a form response that has been written, as in step 61, to appear as if it was written only after a communication 11 was required and moreover specifically in response to the particular communication 11. In step 60, the computer system will determine an appropriate response communication 11, such as a letter or postcard, from a plurality of responses 29. In one embodiment, the basis for the selection of a particular "custom" response letter is the data extracted from the original communication 11. Based on the extracted data, the computer system may suggest the use of a particular response letter to the account holder, administrator, or other valid user through the use of a pop-up window such as sub-field 32. As discussed below, this selection process may be even further refined by incorporating results from statistical analysis (step 64). In any event, the user can use the suggested response, select a different response, create a new response or create an actual response. In other embodiments, the computer system can automatically select the "customized" response, thereby removing the need for actual human intervention prior to generation of a response letter. This will, of course, facilitate the processing and generation of a response 18. Of course, an account holder, administer, or other valid user can customize the response not only in content, but, in some embodiments, also in type of response such as a letter, e-mail, instant message, recorded phone call, text message or the like.

Once the response is selected, the information can be sent to the mail fulfillment center 24 where step 62 is performed, namely generating a response by computer system 104 and from which the generated response is transmitted, step 63. In step 63, the generated response may be printed and mailed or sent out electronically. In some embodiments where electronic responses are used, the information can be sent directly from the computer system 104. For mail responses, bulk mail procedures may be used.

In one preferred embodiment, the "customized" letter selected in step 60 can be further "personalized", as in step 64, by including personal data specific to the addressee or other data specific to a category in which the address may be assigned in accordance with steps 54 and 58. In some embodiments, additional items may be included with the response, such as autographed pictures or other images, or data collection devices, such as surveys. In this manner, more information about the parties interested in the celebrity 23 can be generated to better define their "fan" base, following, or constituencies. Such information thereafter be imported into database 22 and may be utilized in future responses 18 to fans.

Finally, organized information can be utilized to provide profiling of a group, whether it be a fan base, following, constituency or other group. As shown in step 65, statistical analysis of such groups can be conducted for various purposes such as market research, market intelligence, data-mining, data-enhancement and data-comparison. To this end, the information collected and stored in the database 22 can be analyzed by analytic software contained on the computer system to generate useful information including defining a demographic and using it in target marketing, displaying the market power generated by the account holder. In one preferred embodiment, this statistical analysis can be used to refine response selection step 60.

Data may also be extracted, such as in step 66, for a variety of other uses. For example, in step 68, based on the statistical analysis of step 64, a fan may be sent communications concerning promotions, invitations, contests and the like. Preferably, such activities can be used to generate even more information for inclusion in database 22 such that the overall system is functioned to continuously expand database 22 such that the overall system functions to continuously expand database 22 and hence improve the automated response operations of the system.

Finally, the foregoing steps may be utilized in step 70 to generate various reports, such as for example only, trend reports, total number of people in the database, number of responses sent for the current month and year and/or during the life of the database, number of communications received for the current month and year and/or during the life of the database and any data based on any datafield (e.g., State, zip code, etc.).

As stated above, the account holder, administrator or other user may interface with the ASP, web-based, network-based or other computer system to manage the database and the information contained therein. The account holder, administrator or other user will be able to login over a secure Internet connection to a customized client interface. The system will provide a means for celebrities to easily disseminate communications and information to the contacts within their database. This system provides a web-based solution that cuts costs, increases interaction with the persons contained within the database and enhances value by providing the ability to scan, sort, compare, contrast and otherwise analyze the data.

It should be noted that the correspondence fulfillment method depicted in FIG. 5 is an exemplary embodiment and steps may be broken up, re-arranged, altered, or otherwise expanded to achieve the purpose expressed within this application.

In some embodiments, it is anticipated that the Account Holder will pay the administrator for the use of the computer system and the services rendered by the administrator. All financial transactions can be managed via electronic, website connections, utilizing an online credit card billing methodology such as Paypal. The administrators may provide a link, or section that enables the Account Holder or other user to manage their financial obligations. The Account Holder or other user may be able to link to a payment gateway (a process which may be automated on a monthly basis). An Account Holder profile can also be created to enable the Account Holder to manage the information provided to the administrator including name, credit card information, address, phone number, e-mail address, etc.

A more detailed representation of the system of the invention is shown in FIG. 6, in which a computer system 100 for undertaking the correspondence fulfillment process 20 is illustrated. Incoming communications 11 arrive at the correspondence fulfillment center 21 and are scanned, saved or imported as an image file into a correspondence fulfillment center server 104 (or some other type of computer hardware which can provide Internet connection) and convert the image file into a .txt file ("text file") using an Optical Character Recognition ("OCR") software. The new converted text file is sent to a web application server 108 using a extensible markup language ("XML") data feed 106 where data is extracted and saved to a database 22. The database 22 is preferably a relational database which employs Structured Query Language ("SQL") to update and retrieve data, although it need not be. The web application server 108 may be used to extract the data and may be used to manipulate the data to select an appropriate response from a plurality for responses. In one embodiment, application server 108 can be used to generate responses to the communications, and/or to generate reports and analysis of the data.

An administrator 112 and/or an Account Holder 114 can access the web application server 108 through a browser connection 116 or 118, respectively. These browser connections 116, 118 may be through an ASP or some other web-based interface connection. Once connected through a browser connection 116, 118, the administrator 112, or the account holder 114, can authorize the sending of responses 18 to the sender of the communications 11 received. Further, they can use the data stored in the database to analyze the Account Holder's fan base, following or constituency.

Once a response 18 to the incoming communication 11 is selected from the plurality of response 29, either through a program on the web application server 108 or by the administrator 112 or the account holder 114, the selected response is sent back to the correspondence fulfillment center server 104 via an XML data feed 120. The response is subsequently printed and mailed or sent electronically as an outgoing response 18. If the response is to be sent electronically, in some embodiments, the web application server 108 can undertake this task.

While one embodiment of the physical hardware arrangement has been presented in FIG. 6, those skilled in the art will understand that the arrangement of physical equipment can take almost any form, and thus, the physical system is not intended to be limited by the embodiment illustrated therein. As an example, print center 24 and mail fulfillment center 21 can be the same. Likewise, application server 108 and the correspondence fulfillment server 104 can be the same computer system.

Through the use of the system and method described above, a receiving entity that receives large volumes of correspondence can more effective respond, comprehend and utilize the information provided by such correspondence and respond to it in an appropriate manner. The system and method further permit a receiving entity to gain a better understanding characteristics of a group, fan base, following or constituency, that generates such communications. While the receiving entity has been described as a "celebrity" herein, the receiving entity can be any entity that receives large volumes of communications to which standardized or form response can be utilized.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the invention.

What is claimed:

1. A method for automating generation of responses to communications, said method comprising the steps of:
   A. Receiving an incoming communication from a transmitting party;
   B. Creating an electronic file for such received communication;
   C. Extracting a first set of data from said electronic file;
   D. Storing the first set of data in a database;
   E. Identifying one or more keywords required to be found in the first set of data;
   F. Comparing the first set of data to the key words to create a second set of data stored in the database, the second set of data extracted from the first set of data and being key words found in the first set of data;
   G. Storing a plurality of pre-defined possible responsive templates on a computer system, all of which are related to the first set of data;
   H. Comparing the second set of data to the plurality of the templates stored on the computer system;
   I. Performing a statistical analysis on a group of the plurality of templates and second set of data;
   J. Utilizing a computer system to automatically select a pre-defined responsive template based on at least one of said first set of data, said second set of data, and said statistical analysis;

K. Utilizing a computer system to automatically generate an actual responsive communication based on said selected pre-defined responsive template; and L. Transmitting said actual responsive communication.

2. The method of claim 1, wherein the steps of C-L are automated.

3. The method of claim 1, further comprising the step of utilizing a computer system to classify said received communication based on the first set of data.

4. The method of claim 1, further comprising the step of importing a portion of said first set of data into said selected pre-defined responsive template to generate said communication.

5. The method of claim 1, further comprising the step of extracting a third set of data from said electronic file.

6. The method of claim 5, wherein the step of selecting a pre-defined responsive template is further based on said third set of data.

7. The method of claim 1, further comprising the step of using the computer system to conduct a second statistical analysis on said first set of data.

8. The method of claim 7, wherein the step of selecting a pre-defined responsive template is further based on said second statistical analysis.

9. The method of claim 1, further comprising the step of conducting a second statistical analysis on said first set of data and said second set of data.

10. The method of claim 9, wherein the step of selecting a pre-defined responsive template is further based on said second statistical analysis.

11. The method of claim 1, further comprising the step of profiling the transmitting party based on first set of data and said second set of data and classifying the said received communication based on said step of profiling.

12. The method of claim 1, wherein the step of generating includes the step of populating said actual responsive communication with a portion of said first set of data.

13. A method for generating responses to communications, said method comprising the steps of A. Storing a plurality of pre-defined possible responsive templates on a computer system;

B. Receiving incoming communications from a plurality of transmitting parties;

C. Creating an electronic file for each such received communication;

D. Extracting a first set of data from each of said electronic files;

E. Storing the plurality of first sets of data in at least one electronic database;

F. Utilizing software to classify each of said received communication based on the database;

G. Identifying one or more keywords required to be found in a first set of data;

H. Comparing a first set of data to the key words to create a second set of data stored in the database, the second set of data extracted from a first set of data and being key words found in a first set of data;

I. Comparing the second set of data to a plurality of the templates stored on the computer system;

J. Performing a statistical analysis on the group of plurality of templates and second set of data;

K. For each received communication, utilizing a computer program to automatically select from the plurality of pre-defined possible responsive template stored on a computer system a desired responsive template, wherein the step of selecting is based on at least one of said first set of data associated with said received communication, the second set of data, and the statistical analysis;

L. Utilizing a computer system to automatically generate an actual responsive communication for each received communication based on said selected responsive template; and M. Transmitting said actual responsive communication, N. Wherein steps of D-M are automated.

14. The method of claim 13, further comprising the step of conducting a second statistical analysis on said first set of data and said second set of data and wherein the step of selecting comprises selecting a pre-defined responsive template based on said second statistical analysis.

15. The method of claim 1, wherein the transmitting party is a fan of a celebrity, and further comprising accessing the electronic file, by the celebrity, via a web-based program.

16. The method of claim 1, wherein the communication is addressed to a celebrity, and further comprising distributing the communication to a manager that manages the celebrity.

17. The method of claim 1, further comprising organizing a fan list based on said first set of data.

18. A method for automating generation of responses to communications, said method comprising:

A. Storing a plurality of pre-defined possible responsive templates on a computer system;

B. Receiving, at a mail fulfillment center, a communication from a fan to a celebrity;

C. Creating an electronic file for such received communication;

D. Extracting a first set of data from said electronic file;

E. Storing the first set of data in a database;

F. Accessing the electronic file, by the celebrity, via a web-based program coupled to the database;

G. Identifying one or more keywords required to be found in the first set of data;

H. Organizing a fan list based said first set of data;

I. Comparing the first set of data to the key words to create a second set of data stored in the database, the second set of data extracted from the first set of data and being key words found in the first set of data;

J. Comparing the second set of data to a plurality of the templates stored on the computer system;

K. Performing a statistical analysis using the fan base, second set of data and plurality of pre-defined possible responsive templates;

L. Utilizing a computer system to automatically select a pre-defined responsive template based on at least one of said first set of data, said second set of data, and said statistical analysis;

M. Utilizing a computer system to automatically generate an actual responsive communication based on said selected pre-defined responsive template;

N. Transmitting said actual responsive communication;

O. Performing targeted marketing based on the statistical analysis; and

P. Accessing, via the web-based program, at least one of said first set of data, said second set of data, and said statistical analysis.

* * * * *